United States Patent
Rimböck et al.

(10) Patent No.: US 12,338,127 B2
(45) Date of Patent: Jun. 24, 2025

(54) METHOD FOR REFINING CRUDE SILICON MELTS USING A PARTICULATE MEDIATOR

(71) Applicant: Wacker Chemie AG, Munich (DE)

(72) Inventors: Karl-Heinz Rimböck, Heldenstein (DE); Konrad Mautner, Burghausen (DE)

(73) Assignee: Wacker Chemie AG, Munich (DE)

( * ) Notice: Subject to any disclaimer, the term of this patent is extended or adjusted under 35 U.S.C. 154(b) by 849 days.

(21) Appl. No.: 17/607,888

(22) PCT Filed: Apr. 30, 2019

(86) PCT No.: PCT/EP2019/061048
§ 371 (c)(1),
(2) Date: Oct. 31, 2021

(87) PCT Pub. No.: WO2020/221440
PCT Pub. Date: Nov. 5, 2020

(65) Prior Publication Data
US 2022/0219994 A1  Jul. 14, 2022

(51) Int. Cl.
*C01B 33/037* (2006.01)

(52) U.S. Cl.
CPC ........ *C01B 33/037* (2013.01); *C01P 2004/60* (2013.01)

(58) Field of Classification Search
CPC ....... C01B 33/037; C01B 33/00; C01B 33/08; C01P 2004/60; C01P 2006/14; C01P 2006/80; C01P 2006/16
See application file for complete search history.

(56) References Cited

U.S. PATENT DOCUMENTS 5,788,945 A  8/1998  Schei
7,682,585 B2  3/2010  Lynch et al.
9,039,833 B2  5/2015  Tathgar
9,327,987 B2*  5/2016  Mohsseni-Ala ........ C30B 15/00
2013/0171052 A1  7/2013  Mohsseni-Ala et al.

FOREIGN PATENT DOCUMENTS

| CN | 101066762 A | 11/2007 |
|---|---|---|
| CN | 101855391 A | 10/2010 |
| CN | 103318894 A | 9/2013 |
| DE | 69508498 T2 | 11/1999 |
| EP | 2321220 B1 | 4/2016 |
| WO | 2009043167 A1 | 4/2009 |
| WO | 2010098676 A1 | 9/2010 |

OTHER PUBLICATIONS

A. Schei, J.K. Tuset, H. Tveit: „Production of High Silicon Alloys, 1998, Tapir forlag, Trondheim.

* cited by examiner

*Primary Examiner* — Sally A Merkling
*Assistant Examiner* — Logan Edward Laclair

(57) ABSTRACT

A process for refining crude molten silicon. The process includes oxidatively refining the crude molten silicon in the production of technical silicon. The crude molten silicon is admixed during the refining with a particulate mediator which has a minimum amount of metallic silicon of 8% by mass and also at least one or more of the elements H, C, O, F, Cl, Ca, Fe and Al. The particulate mediator is described by a characteristic number K which has a value of 0.03 to 6 mm$^{-1}$ and is calculated using the formula $$K = \frac{6 \cdot (1 - \varepsilon_{m,M})}{d_{50,M}}$$

where $d_{50,M}$ is the particle size (diameter) at 50% of the mass undersize of the grading curve of the particulate mediator [mm] and the $\varepsilon_{m,M}$ is the mean effective porosity of the particulate mediator.

11 Claims, No Drawings

METHOD FOR REFINING CRUDE SILICON MELTS USING A PARTICULATE MEDIATOR

CROSS-REFERENCE TO RELATED APPLICATIONS

This application is a U.S. National Phase application of PCT Application No. PCT/EP2019/061048 filed on Apr. 30, 2019 the disclosure of which is incorporated by reference herein in its entirety.

FIELD OF THE DISCLOSURE

The invention relates to a process for oxidatively refining crude molten silicon in the production of technical silicon, wherein the crude molten silicon is admixed with a particulate mediator which comprises metallic silicon.

The primary present-day applications of silicon in technical grade (technical silicon) are in silicothermic operations, in metal extraction and as a deoxidizer in steel making, with silicon serving as an alloying constituent for cast alloys of aluminum, copper, titanium and iron, and also as a starting material for chemical compounds.

Technical-grade silicon is produced industrially by carbothermic reduction of quartz ($SiO_2$; optionally further additions such as, for example, Fe-containing wastes [ferrosilicon] or calcium carbide [calcium silicon]) at high temperatures (around 2000° C.) and atmospheric pressure in an electric furnace (arc reduction furnace) in accordance with net reaction equation (1). The process is described comprehensively in the standard work "Production of High Silicon Alloys" (A. Schei, J. K. Tuset, H. Tveit, *Production of High Silicon Alloys*, 1998, Tapir forlag, Trondheim).

$$SiO_2 + 2C \rightarrow Si(l) + 2CO(g) \qquad (1)$$

During the operation, reactants, intermediates and products are in a variety of states of matter: solid (C, SiC, $SiO_2$, Si), liquid (Si, $SiO_2$) and gaseous (predominantly CO, SiO). The carbon source used is typically a reduction mixture composed of coke, petroleum coke, bituminous coal, charcoal and wood particles. The atmosphere prevailing in the furnace is a strongly reducing one, composed in particular of SiO and CO. In ongoing operation, $SiO_2$ and C move downward while SiO and CO flow upward. Intermediate species are formed in accordance with the following reaction equations (2)-(7):

$$SiO_2 + C \rightarrow SiO + CO \qquad (2)$$

$$SiO + 2C \rightarrow SiC + CO \qquad (3)$$

$$SiO_2 + 2SiC \rightarrow 3Si + 2CO \qquad (4)$$

$$2SiO_2 + SiC \rightarrow 3SiO + CO \qquad (5)$$

$$SiO_2 + CO \rightarrow SiO + CO_2 \qquad (6)$$

$$2CO_2 + SiC \rightarrow SiO + 3CO \qquad (7)$$

Silicon is formed primarily by the reaction shown in reaction (8).

$$SiO + SiC \rightarrow 2Si + CO \qquad (8)$$

High-temperature operations of this kind necessitate an extremely continuous regime. The raw materials and the liquid crude silicon as well are fed in and discharged, respectively, at intervals. Discharge is accomplished typically by tapping the furnace and subsequently transferring the liquid crude silicon (at a temperature of around 1600 to 1900° C.) into a treatment vessel.

A crucial factor, as well as the economic aspects of an industrial operation (productivity and production costs, for example), is the quality of the product produced. When metallurgical silicon is used in the production of chemical compounds, such as chlorosilanes, impurities contained in the silicon (boron in the form of volatile chlorides, for example) are in part—and despite interim purification stages—carried over into the respective end products (e.g., polycrystalline silicon, silicones) over a number of operating steps. Depending on the field of application, however, these end products have to satisfy very exacting quality requirements (semiconductor/pharmaceutical/food/cosmetics industries). For the production of these products on an industrial scale, therefore, a high-quality starting material—metallurgical silicon—is important.

The raw materials and also electrodes that are typically used in the carbothermic reduction of $SiO_2$ contain various impurities. The liquid crude silicon is typically subjected to oxidative refining in the abovementioned treatment vessels, since at this point there are still up to 5% by mass of impurities in the crude product. In the sector it is customary to refine crude silicon by treatment with a reactive gas mixture (for example, $Cl_2$, $O_2$, $SiCl_4$, wet $H_2$ and $CO_2$ or combinations thereof, typically diluted with an inert gas) and the addition of slag-forming additives (for example, silica sand, limestone, quicklime, dolomite, fluorspar, etc.), with a partition equilibrium between silicon phase and slag phase being established for the secondary elements. During the refining, the temperature of the refining mixture drops from around 1900° C. to down to around 1500° C. In order to prevent the mixture solidifying, it is supplied—as described above—with a reagent which is gaseous under the operating conditions. For example, feeding in oxygen brings about the oxidation of silicon to silicon dioxide, with the energy released keeping the mixture within the treatment vessel in liquid form. The term "oxidative refining" embraces the combination of the feeding-in of an oxygen-containing gas mixture and the addition of one or more slag formers.

When oxidative refining is at an end, the silicon and slag phases of the typically still-liquid mixture are separated.

The major drawbacks with conventional oxidative refining methods are a loss of silicon via the slag in the form of silicon dioxide or metallic silicon trapped in the slag, and also inefficient removal of unwanted secondary elements. This reduces both the economic viability of silicon production and the quality of the corresponding product.

The object of the present invention was to improve the economic viability of the production of technical silicon and also the efficiency of the removal of unwanted secondary elements, and hence the quality of the product.

The invention provides a process for oxidatively refining crude molten silicon in the production of technical silicon, wherein the crude molten silicon is admixed during refining with a particulate mediator which comprises a minimum amount of metallic silicon of 8% by mass and also at least one or more of the elements H, C, O, F, Cl, Ca, Fe and Al, the mediator being described by a characteristic number K which has a value of 0.03 to 6 $mm^{-1}$ and is calculated as follows:

$$K = \frac{6 \cdot (1 - \varepsilon_{m,M})}{d_{50,M}}, \qquad \text{(equation 1)},$$

where
- $d_{50,M}$ is the particle size (diameter) at 50% of the mass undersize of the grading curve of the mediator, $d_{50,Med}$ [mm]
- $\varepsilon_{m,M}$ is the mean, effective porosity of the particulate mediator.

It has surprisingly emerged that adding the particulate mediator having a characteristic number K of 0.03 to 6 mm$^{-1}$ during the refining of crude molten silicon enables an increase to be achieved in the productivity of the production of technical silicon and also in the quality of the technical silicon. The reasons for this are firstly the reduction of silicon losses by more efficient phase separation between silicon and slag, and secondly the more efficient removal of unwanted accompanying elements. The former thus leads to higher yields of technical silicon and hence to a lower specific energy consumption for the production of technical silicon. A further advantage of the process of the invention lies in the possibility of utilizing and/or recycling by-products and wastes within the context of a circular economy.

The crude molten silicon is produced preferably by carbothermic reduction of quartz with coal in an electric furnace.

Oxidative refining of the crude molten silicon is accomplished preferably by treatment with a reactive gas mixture which preferably comprises compounds selected from $Cl_2$, $O_2$, $SiCl_4$, wet $H_2$ and $CO_2$, and combinations thereof. The reactive gas mixture is preferably diluted with an inert gas selected from nitrogen and argon and combinations thereof.

Technical silicon has an Si content of <99.9% by mass, based on the total weight of the technical silicon. The accompanying elements are usually selected from Fe, Ca, Al, Ti, Cu, Mn, Cr, V, Ni, Mg, Co, W, Mo, As, Sb, Bi, S, Se, Te, Zr, Ge, Sn, Pb, Zn, Cd, Sr, Ba, Y, B, C, P and O.

The Si content is determined as follows: 100% by mass minus the weight fractions of the accompanying elements.

Significant varieties of technical silicon which are refined in the process are calcium silicon (calcium disilicide, $CaSi_2$) with 55-65% by mass Si and 35-45% by mass Ca, ferrosilicon with 45-90% by mass Si and 10-55% by mass Fe, and metallurgical silicon with 98-99.5% by mass Si.

The technical silicon produced preferably has a Si content of at least 90% by mass, more preferably at least 95% by mass, more particularly at least 97% by mass.

In the oxidative refining of crude molten silicon, the mediator is added to the crude molten silicon additionally to or instead of the conventional slag-forming additives. Slag-forming additives are preferably selected from silica sand, limestone, quicklime, dolomite and fluorspar.

In one preferred embodiment the weight fraction of reactive carbon in the mediator, based on the total mass of the mediator, is at most 0.1, preferably at most 0.08, more preferably at most 0.06, more particularly at most 0.04. In the present invention, "reactive carbon" is intended to refer to that carbon fraction of the mediator that reacts with 02 up to a temperature of 1100° C. with thermooxidative degradation. Reactive carbon typically comprises carbon in organic compounds (e.g., oils, fats, polymers) and also carbon in inorganic compounds (e.g. carbonates, carbides) and elemental carbon in its allotropic forms.

According to one preferred embodiment the mediator has a water content of not more than 5% by mass, preferably of not more than 3% by mass, more preferably of not more than 1% by mass, more particularly of not more than 1000 ppmw. According to one preferred embodiment the mediator has an oxygen weight fraction of not more than 0.4, preferably not more than 0.3, more preferably not more than 0.2, more particularly not more than 0.15, but at least 0.01.

The minimum amount of metallic silicon in the mediator is preferably 10% by mass, more preferably at least 20% by mass, very preferably at least 30% by mass, more particularly at least 40% by mass.

The mediator preferably comprises silicon residues which are preferably selected from by-products or wastes from the silicon-producing or silicon-processing industries, examples being
- those arising in the production or in the mechanical working of silicon, such as poly-, multi- or monocrystalline silicon, with the mechanical working relating in particular to crushing, grinding and/or sawing;
- those arising in the production of granulated silicon metal, as for example in fluidized bed, centrifugal, gas atomization and water granulation processes;
- those arising in the production of technical-grade silicon by means of carbothermic reduction of $SiO_2$;
- those arising in the mechanical working and optionally one or more classifying processes of technical silicon. The mechanical working may relate more particularly to crushing and/or grinding. Examples of typical classifying processes are sieving and/or sifting;
- those arising in the production of silanes. These may be, for example, neutralized catalyst material from chlorosilane reactors, before and/or after recovery of Cu; more particularly, from Müller-Rochow direct synthesis operations, hydrochlorination or low-temperature converting of silanes.

Purification of these silicon residues prior to use in the mediators in accordance with the invention is typically not necessary.

The mediator preferably comprises at least 10% by mass of silicon residues, more preferably at least 20% by mass, very preferably at least 30% by mass, more particularly at least 50% by mass of silicon residues.

The mediator is subjected preferably to a process of comminution (e.g., grinding, crushing), classifying (e.g., sieving, sifting) and/or agglomeration (e.g., pelletizing, briquetting, sintering) in order to obtain the desired value for characteristic number K.

In order to establish specifically defined values for characteristic number K, the mediator is preferably agglomerated (by pelletizing, briquetting and/or sintering, for example) and dried.

The elements present in the mediator alongside the metallic silicon may take the form of compounds or alloys of these elements.

Besides the elements already described, the particulate mediator may comprise the following accompanying elements: Si, Li, Na, K, Mg, Ca, Ba, Ti, Zr, V, Cr, Mo, W, Mn, Fe, Co, Ni, Cu, Zn, B, Sn, Pb, N, P, As, Sb, Bi, S.

The mass ratio of mass (mediator) to mass (crude molten silicon) on addition of the mediator is preferably 0.01 to 0.5, more preferably 0.02 to 0.25, very preferably 0.03 to 0.15, more particularly 0.04 to 0.1.

$d_{50,M}$ is preferably 1 to 100 mm, more preferably 10 to 75 mm, very preferably 15 to 50 mm, more particularly 20 to 30 mm.

The particulate mediator preferably has a mean effective porosity of 0 to 0.6, more preferably of 0.05 to 0.4, very preferably of 0.1 to 0.35, more particularly of 0.15 to 0.3.

When oxidative refining is at an end, the technical silicon and slag phases of the typically still-liquid mixture are separated and the liquid technical silicon is solidified on a chilled surface or in a chilled medium. This may be accomplished, for example, by decanting the mixture, pouring the floating technical silicon phase into a trough and solidifying the technical silicon in said trough.

It may further be preferable for the liquid technical silicon to be specifically doped or alloyed with elements. This may be appropriate, for example, if the technical silicon to be produced is intended for use in the synthesis of chlorosilanes. This involves one or more of the elements from the group containing Al, Cu, Sn, Zn, O and P, or a compound or two or more compounds of these elements, or mixtures of these elements and compounds.

The silicon content of the mediator may be determined for example via X-ray fluorescence analysis (XFA), ICP-based analytical methods (ICP-MS, ICP-OES) or atomic absorption spectroscopy (AAS).

For mixtures of particulate substances having particle diameters of predominantly >0.1 mm, sieve analyses are typically conducted in order to characterize the particle mixture. Determining the particle size distribution by means of sieve analysis is accomplished according to DIN 66165. Mean particle sizes/diameters may be calculated from particle size distributions according to DIN ISO 9276-2.

The total porosity of a substance is composed of the sum total of the voids which communicate with one another and with the surroundings (open porosity; here, in the present invention: effective porosity) and of the voids not in communication with one another (closed porosity). The porosity measurements are carried out according to the Archimedean principle in accordance with ASTM C373-88. The porosity of a material may also be accomplished by calculation from the absolute density and the apparent density. The absolute density and the apparent density may be determined by means of weight measurement and volume measurement using gas pyknometers. Determination of the density of solids is described in DIN 66137-2:2019-03.

Determining the fraction of "reactive carbon" and the water content in the mediator is accomplished preferably using a multiphase analyzer such as, for example, LECO RC-612 (cf. also DIN 19539).

EXAMPLES

The experiments described below were carried out in ambient air and at room temperature (20° C.).

Liquid crude silicon from a continuous production process for metallurgical silicon was captured in a treatment vessel and then subjected over a period of 100 minutes, with addition of different mediators, to oxidative refining (refining gas: oxygen/air mixture [oxygen content at 30% by volume, based on total volume of the gas mixture]; volume flow rate of the mixture: 16 Nm$^3$/h per tonne of liquid crude silicon), and the silicon phase was decanted into a trough and finally solidified. After cooling to room temperature and mechanical removal of the silicon from the trough, determinations were made of the specific energy consumption per tonne of silicon product and the purity of the silicon product. The experiments were analyzed in comparison to conventional processes: the specific energy consumption per tonne of silicon product is typically 13.0 MWh/t, with the purity of the silicon product being around 98.5%. Tables 1 and 3 provide an overview of the mediators used—the results of the experiments are summarized in Tables 2 and 4.

TABLE 1

| Me-diator | K [mm$^{-1}$] | Si [% by mass] | Accompanying elements | Amount [% by mass] | | |
|---|---|---|---|---|---|---|
| | | | | Water | O | C |
| A | 0.09 | 10 | Fe, Ca, Al, F, Cl | 5 | 40 | 10 |
| B | 0.09 | 10 | Fe, Ca, Al, F, Cl | 0.05 | 0.5 | 5 |
| C | 0.09 | 10 | Fe, Ca, Al, F | 5 | 15 | 2 |
| D | 0.09 | 10 | Fe, Ca, Al | 5 | 15 | 2 |
| E | 0.09 | 10 | Fe, Ca, Al | 5 | 15 | 2 |
| F | 0.09 | 20 | Fe, Ca, Al | 1 | 15 | 2 |
| G | 0.09 | 40 | Fe, Ca, Al | 0.5 | 10 | 2 |
| H | 0.09 | 50 | Fe, Ca, Al | 1 | 15 | 2 |
| I | 0.09 | 60 | Fe, Ca, Al | 1 | 15 | 2 |
| J | 0.09 | 80 | Fe, Ca, Al | 1 | 15 | 2 |

TABLE 2

| Experiment | Mediator | Mass ratio m(mediator)/m(crude silicon) | Specific energy consumption [MWh/t] | Purity [% by mass Si] |
|---|---|---|---|---|
| 1 | A | 0.1 | 12.92 | 98.8 |
| 2 | B | 0.1 | 12.91 | 98.8 |
| 3 | C | 0.1 | 12.91 | 98.7 |
| 4 | D | 0.1 | 12.9 | 98.8 |
| 5 | E | 0.1 | 12.9 | 98.8 |
| 6 | F | 0.1 | 12.85 | 98.9 |
| 7 | G | 0.1 | 12.87 | 98.8 |
| 8 | H | 0.1 | 12.8 | 98.9 |
| 9 | I | 0.1 | 12.78 | 98.9 |
| 10 | J | 0.1 | 12.75 | 98.9 |

TABLE 3

| Me-diator | K [mm$^{-1}$] | Si [% by mass] | Accompanying elements | Amount [% by mass] | | |
|---|---|---|---|---|---|---|
| | | | | Water | O | C |
| K | 0.03 | 50 | Fe, Ca, Al | 1 | 13 | 2 |
| L | 0.04 | 50 | Fe, Ca, Al | 1 | 13 | 2 |
| M | 0.06 | 50 | Fe, Ca, Al | 1 | 13 | 2 |
| N | 0.09 | 50 | Fe, Ca, Al | 1 | 13 | 2 |
| O | 0.11 | 50 | Fe, Ca, Al | 1 | 13 | 2 |
| P | 0.18 | 50 | Fe, Ca, Al | 1 | 13 | 2 |
| Q | 0.42 | 50 | Fe, Ca, Al | 1 | 13 | 2 |
| R | 0.96 | 50 | Fe, Ca, Al | 1 | 13 | 2 |
| S | 1.14 | 50 | Fe, Ca, Al | 1 | 13 | 2 |
| T | 3.6 | 50 | Fe, Ca, Al | 1 | 13 | 2 |
| U | 6 | 50 | Fe, Ca, Al | 1 | 13 | 2 |

TABLE 4

| Experiment | Mediator | Mass ratio m(mediator)/m(crude silicon) | Specific energy consumption [MWh/t] | Purity [% by mass Si] |
|---|---|---|---|---|
| 11 | K | 0.1 | 12.81 | 98.8 |
| 12 | L | 0.1 | 12.81 | 98.8 |
| 13 | M | 0.1 | 12.77 | 98.8 |
| 14 | N | 0.1 | 12.8 | 98.9 |
| 15 | O | 0.1 | 12.75 | 99.0 |
| 16 | P | 0.1 | 12.74 | 99.1 |
| 17 | Q | 0.1 | 12.72 | 99.0 |
| 18 | R | 0.1 | 12.63 | 99.1 |
| 19 | S | 0.1 | 12.65 | 98.9 |
| 20 | T | 0.1 | 12.82 | 98.7 |
| 21 | U | 0.1 | 12.85 | 98.6 |
| 22 | R | 0.01 | 12.94 | 98.6 |
| 23 | R | 0.5 | 12.32 | 99.5 |
| 24 | R | 0.25 | 12.44 | 99.2 |
| 25 | R | 0.02 | 12.93 | 98.7 |

TABLE 4-continued

| Experiment | Mediator | Mass ratio m(mediator)/ m(crude silicon) | Specific energy consumption [MWh/t] | Purity [% by mass Si] |
|---|---|---|---|---|
| 26 | R | 0.15 | 12.57 | 99.2 |
| 27 | R | 0.03 | 12.92 | 98.8 |
| 28 | R | 0.04 | 12.90 | 98.9 |

The examples show that the inventive use of mediators in the production of metallurgical silicon is advantageous economically.

The invention claimed is:

1. A process for oxidatively refining crude molten silicon in the production of technical silicon, comprising:
    admixing the crude molten silicon during refining with a particulate mediator which comprises a minimum amount of metallic silicon of 8% by mass and at least one or more of the elements H, C, O, F, Cl, Ca, Fe and Al, wherein the particulate mediator is described by a characteristic number K which has a value of 0.03 to 6 mm-1 and is calculated as follows:

$$K = \frac{6 \cdot (1 - \varepsilon_{m,M})}{d_{50,M}}, \quad \text{(equation 1)},$$

wherein $d_{50,M}$ is the particle size (diameter) at 50% of the mass undersize of the grading curve of the particulate mediator [mm]; and
wherein $\varepsilon_{m,M}$ is the mean effective porosity of the particulate mediator.

2. The process of claim 1, wherein the technical silicon has an Si content of at least 95% by mass.

3. The process of claim 1, wherein the particulate mediator comprises silicon residues selected from by-products or wastes which are obtained in the production or in the mechanical working of silicon.

4. The process of claim 1, wherein a weight fraction of reactive carbon in the particulate mediator, based on the total mass of the particulate mediator, is at most 0.1, with the reactive carbon being that carbon fraction of the particulate mediator that reacts with $O_2$ up to a temperature of 1100° C. with thermo-oxidative degradation.

5. The process of claim 1, wherein the particulate mediator has a water content of not more than 5% by mass.

6. The process of claim 1, wherein the particulate mediator has an oxygen weight fraction of not more than 0.4% by mass.

7. The process of claim 1, wherein the mass ratio of the mass of the particulate mediator to the mass of the crude molten silicon on addition of the particulate mediator is 0.01 to 0.5.

8. The process of claim 1, wherein the particulate mediator aids in the formation of slag.

9. The process of claim 8, further comprising allowing for a phase separation to occur between a silicon phase and a slag phase.

10. The process of claim 9, further comprising allowing a distribution equilibrium to occur in a liquid phase mixture between the silicon phase and the slag phase; and
    allowing an amount of impurities to accumulate within the slag phase.

11. The process of claim 1, wherein the silicon formed is technical silicon having less than 99.9 wt % Si therein.

* * * * *